US008418162B2

(12) United States Patent
Willis, II

(10) Patent No.: US 8,418,162 B2
(45) Date of Patent: *Apr. 9, 2013

(54) NETWORK DELIVERED DYNAMIC PERSISTENT DATA

(75) Inventor: Edward Snow Willis, II, Ottawa (CA)

(73) Assignee: Research In Motion Limited, Waterloo, CA (US)

( * ) Notice: Subject to any disclaimer, the term of this patent is extended or adjusted under 35 U.S.C. 154(b) by 1214 days.

This patent is subject to a terminal disclaimer.

(21) Appl. No.: 10/765,511

(22) Filed: Jan. 27, 2004

(65) Prior Publication Data
US 2005/0166199 A1    Jul. 28, 2005

(51) Int. Cl.
G06F 9/45    (2006.01)

(52) U.S. Cl.
USPC ............................ 717/168; 717/170; 717/174

(58) Field of Classification Search .................... 717/168
See application file for complete search history.

(56) References Cited

U.S. PATENT DOCUMENTS

| 6,347,398 | B1* | 2/2002 | Parthasarathy et al. | 717/178 |
| 6,597,908 | B1* | 7/2003 | Yu | 455/424 |
| 6,785,885 | B2* | 8/2004 | Norris et al. | 717/178 |
| 6,859,924 | B1* | 2/2005 | Kroening | 717/173 |
| 6,996,819 | B1* | 2/2006 | Alanis | 717/173 |
| 7,222,340 | B2* | 5/2007 | Willis, II | 717/168 |
| 7,287,068 | B1* | 10/2007 | Eriksson et al. | 709/221 |
| 7,360,210 | B1* | 4/2008 | Vacanti et al. | 717/171 |
| 2002/0073410 | A1* | 6/2002 | Lundback et al. | 717/171 |
| 2002/0078142 | A1* | 6/2002 | Moore et al. | 709/203 |
| 2003/0005426 | A1* | 1/2003 | Scholtens et al. | 717/169 |
| 2003/0033442 | A1* | 2/2003 | Halpern et al. | 709/315 |
| 2003/0121033 | A1* | 6/2003 | Peev et al. | 717/175 |
| 2003/0145317 | A1* | 7/2003 | Chamberlain | 717/177 |
| 2003/0195995 | A1 | 10/2003 | Tabbara | |
| 2003/0221189 | A1* | 11/2003 | Birum et al. | 717/170 |
| 2004/0068721 | A1* | 4/2004 | O'Neill et al. | 717/168 |
| 2004/0216133 | A1* | 10/2004 | Roush | 719/316 |

(Continued)

FOREIGN PATENT DOCUMENTS

| EP | 1 306 755 | 5/2003 |
| EP | 1 429 569 | 6/2004 |
| WO | WO 00/74412 | 12/2000 |

OTHER PUBLICATIONS

"Gentoo Linux Documentation—Portage Manual"; Apr. 27, 2002; http://web.archive.org/web/20021017090406/www.gentoo.org/doc/portage-manual.html; pp. 1-17.*

Primary Examiner — Wei Zhen
Assistant Examiner — Matthew Brophy
(74) Attorney, Agent, or Firm — Moffat & Co.

(57) ABSTRACT

A method and apparatus of dynamically managing non-volatile memory items on a wireless device through a network, the method comprising the steps of: when connecting to said network, checking for a unique identifier item stored in said non-volatile memory items; if said unique identifier item exists, checking whether a value stored in said unique identifier is the same as a software identifier located in software on said wireless device; if said unique identifier item does not exist or said value is different from said software identifier, sending said software identifier along with an identifier indicating a carrier to said network along with an identifier indicating a carrier; receiving from said network a set of changes related to said software identifier; executing said set of changes to update said non-volatile memory items; and writing said software identifier to said unique identifier item.

11 Claims, 2 Drawing Sheets

U.S. PATENT DOCUMENTS

| | | | |
|---|---|---|---|
| 2005/0055690 A1* | 3/2005 | Cornillon et al. | 717/174 |
| 2005/0166199 A1* | 7/2005 | Willis, II | 717/173 |
| 2005/0166200 A1* | 7/2005 | Willis, II | 717/173 |
| 2007/0169073 A1* | 7/2007 | O'Neill et al. | 717/168 |
| 2008/0270677 A1* | 10/2008 | Kolakowski | 711/103 |

* cited by examiner

NETWORK DELIVERED DYNAMIC PERSISTENT DATA

FIELD OF THE INVENTION

The present invention relates to dynamic management of persistent data in the non-volatile memory of a wireless device, and in particular deals with a method and apparatus of dynamically delivering non-volatile memory items over a network after a new software load is added. The dynamic management of the persistent data is done in a manner which allows the rollback to previous software loads if necessary.

BACKGROUND TO THE INVENTION

Device specific, carrier specific and software-load specific persistent data is typically written to non-volatile memory at the time the device is built in the factory. If any error is introduced at this build time, or if a carrier's requirements change after the build time, or if new features are introduced in subsequent software loads which require updated persistent data, no mechanism exists to update these previously-released devices except for recalling them to a service outlet for reconfiguration.

Further, even if a means for writing updated data to a wireless device existed, a potential problem is introduced for backward compatibility. A typical situation in which backward compatibility is required would be if the user has received a software update for their wireless device and then subsequently has downgraded their software load to the previous release. In this case, the new persistent data which is presented with the updated software load may not be supported by the previous software load, causing potential software errors on the wireless device.

SUMMARY OF THE INVENTION

The present invention allows persistent data items in non-volatile memory that require changes following the release of a device to the field to be rewritten during the first connection to the network following the loading of new software, wherein decisions about changes to the non-volatile memory data items are made by the network. The changes are made and implemented in such a manner that safe rollback semantics are achieved. In this way, if the user desires, loading an earlier software release will allow the rollback of data to the previous state and thus negate the changes in the persistent data.

The present invention further supports the ability to change persistent data regardless of what release of the software is on the device. This may be implemented in situations where a bug is found to be caused by an incorrect value stored in the persistent data. In this case, regardless of the release, it is desirable to universally modify the persistent data.

The present invention further provides that changes to the persistent data can be implemented on a per-carrier basis. Alterations to persistent data can be implemented in a particular software load only for a particular carrier (or carriers). This allows carrier flexibility.

The present invention therefore provides a method of dynamically managing non-volatile memory items on a wireless device through a network, said method comprising the steps of: when connecting to said network, checking for a unique identifier item stored in said non-volatile memory items; if said unique identifier item exists, checking whether a value stored in said unique identifier item is the same as a software identifier located in software on said wireless device; if said unique identifier item does not exist or said value is different from said software identifier, sending said software identifier along with an identifier indicating a carrier to said network; receiving from said network a set of changes related to said software identifier; executing said set of changes to update said non-volatile memory items; and writing said software identifier to said unique identifier item; otherwise end.

The present invention further provides a method for dynamically managing non-volatile memory items on a wireless device during registration to a network, said method allowing rollback to previous versions of software using said non-volatile memory items, said method comprising the steps of: on registration, checking the non-volatile memory items for a unique identifier item; if said unique identifier item exists, checking whether a value in said unique identifier item is the same as a software identifier; if said unique identifier item does not exist or if said identifier is different from said software identifier, performing the steps of: sending said software identifier along with an identifier indicating a carrier to said network; receiving a set of changes from said network to update said non-volatile memory items, said updating step: creating a new non-volatile memory item rather than replacing an existing non-volatile memory item to facilitate rollback; retaining non-volatile memory items that have previously been created; avoiding non-volatile memory items created under other non-volatile memory management schemes; and writing said software identifier to said unique identifier item, whereby said creating, retaining, and avoiding steps in said updating step allow rollback to previous versions of software on said wireless device; and otherwise ending.

The present invention still further provides a wireless mobile station comprising: a receiver for receiving signals from a network; a transmitter for transmitting signals to a network; a digital signal processor for processing signals to be sent on said transmitter and received on said receiver; a microprocessor communicating with said digital signal processor; non-volatile memory having program storage and non-volatile memory items, said non-volatile memory communicating with said microprocessor; and input and output subsystems interacting with said microprocessor, said microprocessor including: means for checking said non-volatile memory items for a unique identifier item; means for checking whether a value stored in said unique identifier item is the same as a software identifier; means for updating said non-volatile memory; wherein if said means for checking said non-volatile memory for a unique identifier item finds that said unique identifier item does not exist or said means for checking whether said value finds said value is different from said software identifier, said wireless mobile station sends said software identifier to said network and receives a set of changes from said network, said means for updating said non-volatile memory executing said set of changes and writing said software identifier to said unique identifier item.

BRIEF DESCRIPTION OF THE DRAWINGS

The present invention will be better understood with reference to the drawings, in which.

DETAILED DESCRIPTION OF THE DRAWINGS

Figure 1:
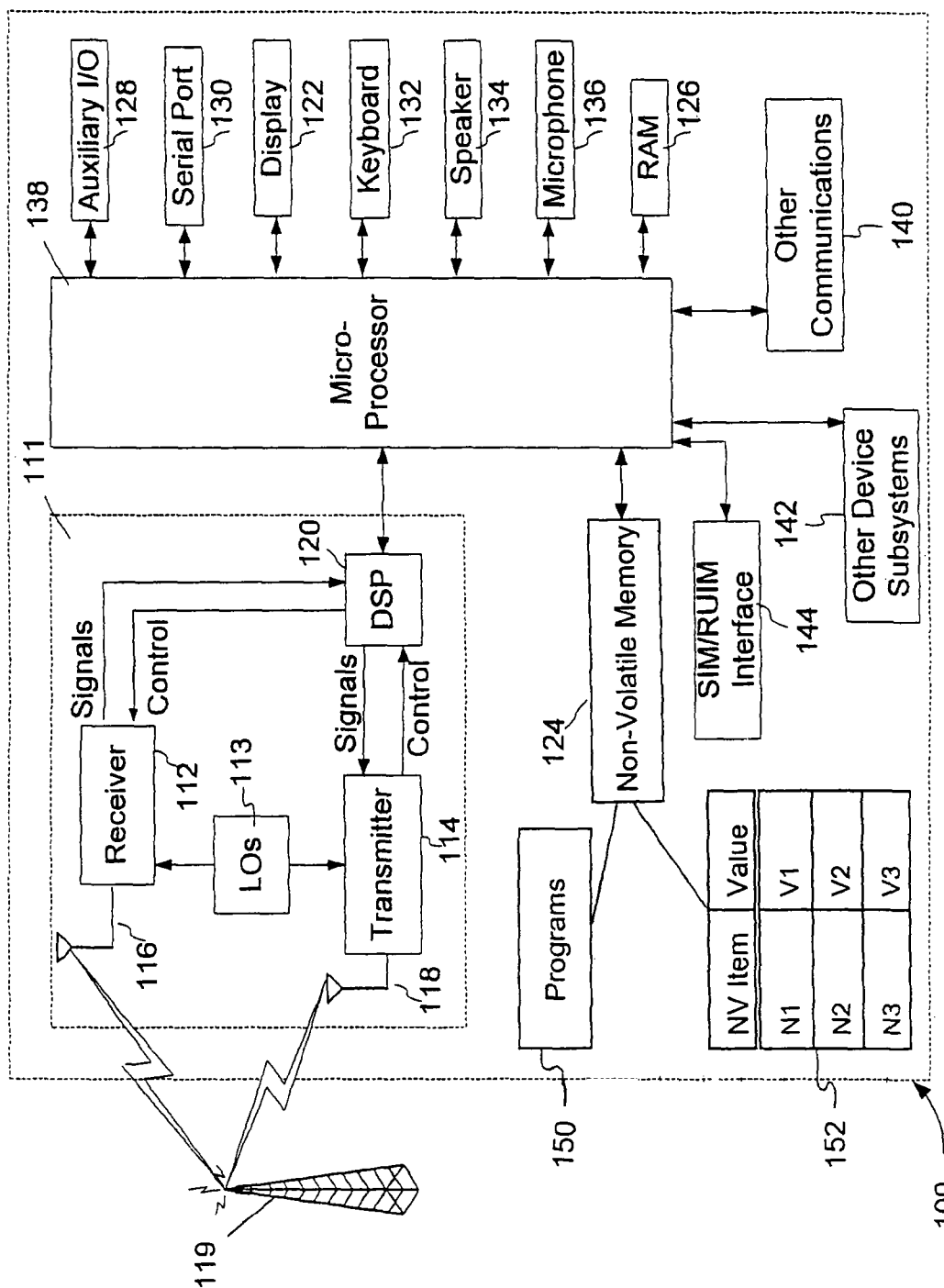
FIG. 1 is a schematic diagram of the apparatus of the present invention.

When loading a new software load on a device, several considerations must be taken into account regarding the manipulation of persistent data in the non-volatile (NV) file system. It is important that the overall inspection and modification of the NV file system must occur only once following a software upgrade. This ensures that values and/or add new items may be set once after a software upgrade, but that any changes to the NV made outside the context of Dynamic NV management do not unexpectedly reset in subsequent time periods.

It is further important that during the one-time execution of the NV file system modification, any existing persistent data in the NV can be set to a given value and that new NV items (also referred to herein as NVs) can be added if necessary.

Referring to the drawings, mobile station 100 is preferably a two-way wireless communication device.

Where mobile station 100 is enabled for two-way communication, it will incorporate a communication subsystem 111, including both a receiver 112 and a transmitter 114, as well as associated components such as one or more, preferably embedded or internal, antenna elements 118, local oscillators (LOs) 113, and a processing module such as a digital signal processor (DSP) 120. As will be apparent to those skilled in the field of communications, the particular design of the communication subsystem 111 will be dependent upon the communication network in which the device is intended to operate.

When required network registration or activation procedures have been completed, mobile station 100 may send and receive communication signals over the network 119. Signals received by antenna 116 through communication network 119 are input to receiver 112, which may perform such common receiver functions as signal amplification, frequency down conversion, filtering, channel selection and the like, and analog to digital (A/D) conversion.

Mobile station 100 preferably includes a microprocessor 138 which controls the overall operation of the device. Communication functions are performed through communication subsystem 111. Microprocessor 138 also interacts with further device subsystems such as the display 122, non-volatile memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Operating system software used by the microprocessor 138 is preferably stored in a persistent store such as non-volatile memory 124, which may instead be a read-only memory (ROM) or similar storage element (not shown). Those skilled in the art will appreciate that the operating system, specific device applications, or parts thereof, may be temporarily loaded into a volatile memory such as RAM 126. Received communication signals may also be stored in RAM 126.

As shown, non-volatile memory 124 can be segregated into different areas for both programs storage 150 and non-volatile memory items 152.

Microprocessor 138, in addition to its operating system functions, preferably enables execution of software applications on the mobile station. A predetermined set of applications that control basic operations will normally be installed on mobile station 100 during manufacturing. Further applications may also be loaded onto the mobile station 100 through the network 119, an auxiliary I/O subsystem 128, serial port 130, short-range communications subsystem 140 or any other suitable subsystem 142, and installed by a user in the RAM 126 or preferably non-volatile memory 124 for execution by the microprocessor 138. Such flexibility in application installation increases the functionality of the device and may provide enhanced on-device functions, communication-related functions, or both. However, when software is upgraded, often non-volatile memory items 152 need to be modified dynamically.

Figure 2:
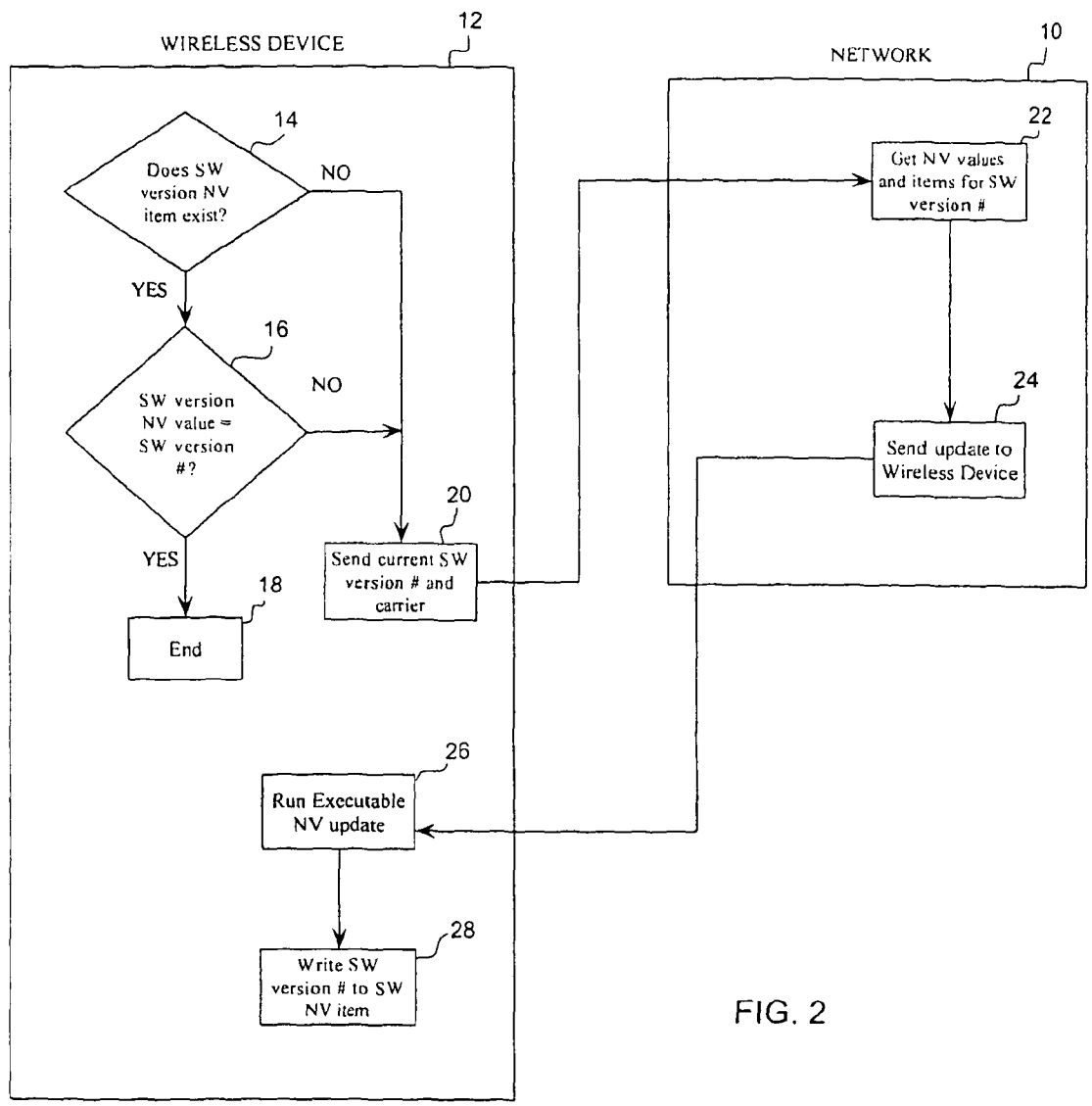
FIG. 2 is a flow diagram of the method of the present invention.

Reference is now made to FIG. 2. During registration to a network 10, wireless device 12 performs a check to see whether a unique identifier such as the software version number is written into persistent data. This is performed in step 14. While the software version number is used as an example below, one skilled in the art will realize that other unique identifiers could be used.

If in step 14 the wireless device finds that the software version number is stored as an NV item, the wireless device 12 next moves to step 16. In step 16 wireless device 12 checks whether the software version number within the NV item is the same as the software version number of the software on wireless device 12.

If step 16 finds that the software version number stored in the NV item matches the version number of the loaded software, wireless device 12 moves to step 18 and ends the process.

If, in step 14, the check finds that the NV item used for storing the software version number does not exist or, in step 16, the check finds that the software version number stored in the NV item does not match the current software version number, the wireless device moves to step 20. In step 20 the current software version number and carrier information is sent to the network.

The network in step 22 receives the current software version number and carrier information, and based on this finds which NV items the wireless device should have, and the values that should be stored in the NV items. A set of changes to be applied is then sent back to the wireless device 12 in step 24.

Wireless device 12, upon receiving the update in step 26, executes it to perform the dynamic management required for the NV items and values. In the last stage of execution, the wireless device 12 moves to step 28, which instructs the wireless device 12 to write the current software version or other identifier to the predetermined location in the NV file system.

The above algorithm can therefore be summarized as:

When registering with a network, check whether an NV item exists for a unique identifier such as the software version number and if the NV item exists, whether the value stored in the identifier is the same as the software identifier.

If the identifier does not exist as an NV item or if the value in the NV item is different from the software identifier, send the network the current software identifier and information about the carrier.

Once the network receives the software identifier and the carrier, it finds the NV items and values the wireless device should have, and sends this set of changes to be applied to the wireless device.

On the wireless device, execute the update to perform any required dynamic management of the NV items and values.

As the last step in the execution of the message, write the current version number to the appropriate NV item.

As will be realized by one skilled in the art, other identifying data besides the software version number could be used to track software updates. This could include any identifier placed within the software that changes between software loads.

By performing the above algorithm, subsequent registrations without changing software loads will not result in further manipulation of the NV file system. This allows changes to NV values outside the context of dynamic NV management and ensures that those values will not be reset to previous values as a side effect of reinitializing the device.

The writing of the current software version number into the NV file system is performed at the end of the message execution. This safeguards the NV file system to ensure that a complete update is performed. If a complete update is not performed, for example if the device has reset or otherwise died before the dynamic NV manipulation have been completed or if the network does not return an update file, the network will detect a mismatch between the NV stored OS version number, if any, and the current OS software version number. This is because at the network connection time, the same algorithm will run as described above and will find that the NV item related to the OS version number differs from the current OS version number found in the software. At the end of a successful manipulation of the NV file system, the OS version number is updated and prevents the network from sending the updated NV file system message to the wireless device again.

For error handling purposes, the key is that the dynamic management of the NVs must be performed completely. Based on the above, a set of changes to be applied are sent to the wireless device after the wireless device sends the current software version number to network 10 upon finding that software version number found in the NV item either does not exist or exists but differs from the software version number. The other scenarios in this case are if there is a failed attempt to write to an NV or a failed attempt to read the message. In these cases, error messages are written and the update is ended without writing the new OS version to the NV item. This ensures that on the next connection, the network will again send an update to complete the dynamic management of the NV.

The above provides the additional benefit that it is easy to implement carrier-specific dynamic NV manipulations. Since the network controls the message being sent to the wireless device, the network can manipulate other NV items appropriate for the carrier.

A further desired feature for NV file system management is the dynamic rollback of the NV to previous software versions. In the situation where a user loads a new software version and decides that they want to revert back to an old version, if the NV file system has been changed, the old version of the software may be relying on an NV item that has been modified and thus may not work correctly. To overcome this, a rollback scheme is proposed for the present invention.

In order to avoid difficulties in rolling back the NV, the following rules should be followed:

Rule 1: An NV should not be both under dynamic management and traditional management. For clarity, an NV item should be set/created based on the set of changes from the network as part of a dynamic NV management scheme or it should managed in some other manner but not both.

Rule 2: The addition of a new NV should be favoured over changing the value of an existing NV. This allows backward compatibility by not changing the values of the present NVs to newer values.

Rule 3: NVs cannot be deleted from the software once a load which creates that NV has been deployed.

If Rule 1 is not observed, a risk exists that dynamically managed NV settings would be overwritten at the device build time or at the factory or device configuration time at the point of sale. If an NV is managed under dynamic management, it should be excluded from management of any existing NV management scheme.

The above also applies on a per carrier basis. If a particular carrier needs an NV setting to change in value for the next software delivery, then that NV should be considered to be under dynamic management for all carriers from that point forward. The NV should be defined and implemented with correct behaviours for those other carriers and software and that NV should be removed from any other NV management scheme.

Once an NV is handled in dynamic management, it can never go back to any other management scheme. This avoids problems with the loading of various software loads and the changing between the software loads.

Rule 2 exists to ensure that values for older loads do not get overwritten by newer loads in the case where a user may revert back to the older load. If the value is overwritten and an older load is reloaded, then a defect could occur in the software. Conversely, if a new NV is added for a new load, then the old load can still be loaded back onto the wireless device while maintaining its functionalities since the original NV has not been overwritten.

The above is better illustrated with an example. For simplicity's sake, the example below assumes that there are only two NV items initially defined as N1 and N2 with values V1 and V2. A first software load, defined as L1, illustrates the last load created that has no dynamic NV support. This load is illustrated in the table below.

TABLE 1

| L1 | |
|---|---|
| N1 | V1 |
| N2 | V2 |

In this load, N1 must have a value of V1. If it does not, a bug will surface in load 1.

A second load alters the configuration of load 1 by adding a new NV, defined below as N3, with a value of V3. N3 is added as a dynamic NV and is not managed in any other way pursuant to Rule 1. When the device is upgraded from L1 to L2, it registers with the network as having different OS versions in the software and the NV items, and this causes a set of changes appropriate for the software load currently on the wireless device to be sent to the wireless device. This messages is executed, and the NV file system transition is as follows:

TABLE 2

| L1 | | L2 | |
|---|---|---|---|
| N1 | V1 | N1 | V1 |
| N2 | V2 | N2 | V2 |
| N3 | N/A | N3 | V3 |

From the table above, it can be seen that a downgrade to the first load L1 is safe since the first and second NV items N1 and N2 have the values that load 1 expects for them.

In a third load, the value for N1 needs to be changed to some new value V4. Rule 2 indicates that we should not change the value of L1, but rather to add a new NV with the desired value and use the new NV instead of the old one. In this case, when the network message is executed, L3 adds a new NV item N4 with the value V4. N4 is thus under dynamic management and not managed in any other way pursuant to Rule 1. The upgrade from L2 to L3 looks like this:

TABLE 3

| L2 | | L3 | |
|----|----|----|----|
| N1 | V1 | N1 | V1 |
| N2 | V2 | N2 | V2 |
| N3 | V3 | N3 | V3 |
| N4 | N/A | N4 | V4 |

Despite the fact that the third load has no need for N1 anymore, N1 is not removed from the NV file system pursuant to Rule 3. From L3, either load 1 or load 2 could be reloaded onto the device and would still work because the previous versions of the NV file system still exist below the changes made for L3. A downgrade to L1 is possible because N1 and N2 have the correct values for load 1. While N3 and N4 appear in the NV file system, they will not be accessed by load 1. Also, a downgrade from load 3 to load 2 is possible since all of the values of N1, N2 and N3 are correct in load 2.

If a user has not implemented load 2 but moves to load 3 directly from load 1, the upgrade will add values for N3 and N4 and will look like the following table:

TABLE 4

| L1 | | L3 | |
|----|----|----|----|
| N1 | V1 | N1 | V1 |
| N2 | V2 | N2 | V2 |
| N3 | N/A | N3 | V3 |
| N4 | N/A | N4 | V4 |

A further addition to ensure compatibility for dynamic management tools is to create a mapping for all NV requests not originating within the device software. This mapping takes the intent of Rule 2, namely the new NV items are intended to completely replace old NV items. Once replaced, it is the intent that all uses of the old NV be replaced by uses of the new NV. In keeping with that intent, the dynamic management tools can ask for items by number.

When a new software load is added, the set of changes from the network 10 may direct the map to changed in the software load to ensure that all of the values used by the load are mapped to the correct NV item.

Software that requests an NV item by number or logical index first goes through the mapping to determine whether it should be getting the value from a new NV item and, if so, gets the value of this new NV item. This mapping ensures that compatibility is maintained between the wireless device third party tools that know about the existence of certain NV items and ask for them by logical index.

The above therefore defines a method for updating the persistent data in the non-volatile memory dynamically, and further discusses an implementation which allows the rollback to previous software loads if desired by the user.

Although the present invention has been described with regard to the preferred embodiments thereof, one skilled in the art will realize that other variations are possible, and that the invention is only intended to be limited in scope by the following claims.

I claim:

1. A method of dynamically managing non-volatile memory items on a mobile station through a network, said method: comprising,
at said mobile station:
managing the mobile station under dynamic memory scheme, comprising:
creating by a processor of the mobile station, non-volatile memory items;
preventing deletion of any non-volatile memory items once said non-volatile memory items are created;
preventing changing of a value of any non-volatile memory items once said non-volatile memory items are created;
when registering to said network, checking for a unique identifier item stored in said non-volatile memory items, for identifying software loaded on said mobile station;
if said unique identifier item exists, checking whether a value stored in said unique identifier item is the same as a software identifier located in said software loaded on said mobile station;
if said unique identifier item does not exist or said value is different from said software identifier, sending only said software identifier along with an identification of a particular carrier company associated with the mobile station, without additional information, to said network;
receiving from said network a set of changes related to said software identifier for said carrier company;
executing said set of changes to update said non-volatile memory items;
writing said software identifier to said unique identifier item;
adding, when upgrading to a new software load, a new non-volatile memory item rather than replacing a value in an existing non-volatile memory item when the new non volatile memory item corresponds to the existing non-volatile memory item; and
managing the new non-volatile memory item under said dynamic management scheme including preventing deletion or changing of a value in said new non-volatile memory item.

2. The method of claim 1, wherein said unique identifier item value and said software identifier are operating system version numbers of software on said mobile station.

3. The method of claim 1, wherein said writing is performed after said updating is complete.

4. The method of claim 1, wherein said updating allows rollback to a previous software version.

5. The method of claim 1, wherein said updating does not delete non-volatile memory items that have previously been created.

6. The method of claim 5, wherein non-volatile memory items managed under other non-volatile memory management schemes are not updated in said updating.

7. The method of claim 1, wherein software on said mobile station includes a mapping from old non-volatile memory items to new non-volatile memory items.

8. The method of claim 7, wherein said mapping is modified using said set of changes.

9. A method for dynamically managing non-volatile memory items on a mobile station during registration to a network, said method allowing rollback to previous versions of software using said non-volatile memory items, said method comprising
at said mobile station:
managing the mobile station under a dynamic memory scheme comprising:
creating by a processor of the mobile station, non-volatile memory items;
preventing deletion of any non-volatile memory items once said non-volatile memory items are created;
preventing changing of a value of any non-volatile memory items once said non-volatile memory items are created;

on registration, checking the non-volatile memory items for a unique identifier item for identifying software loaded on said mobile station;

if said unique identifier item exists, checking whether a value in said unique identifier item is the same as a software identifier located in said software loaded on said mobile station;

if said unique identifier item does not exist or if a value stored in said unique identifier item is different from said software identifier, performing:

sending only said software identifier along with an identification of a particular carrier telecommunications company associated with the mobile station, without additional information, to said network;

receiving a set of changes from said network for said carrier to update said non-volatile memory items, said updating including:

creating a new non-volatile memory item rather than replacing an existing non-volatile memory item to facilitate rollback;

retaining non-volatile memory items that have previously been created;

avoiding non-volatile memory items created under other non-volatile memory management schemes;

writing said software identifier to said unique identifier item; and managing the new non-volatile memory item under said dynamic management scheme including preventing deletion or changing of a value in said new non-volatile memory item, whereby said creating, retaining and avoiding steps in said updating step allow rollback to previous versions of software on said mobile station.

10. A wireless mobile station comprising:
    a receiver for receiving signals from a network;
    a transmitter for transmitting signals to a network;
    a digital signal processor for processing signals to be sent on said transmitter and received on said receiver;
    a microprocessor communicating with said digital signal processor;
    non-volatile memory having program storage and non-volatile memory items, said non-volatile memory communicating with said microprocessor; and
    input and output subsystems interacting with said microprocessor,
    said microprocessor including:
        means for managing the mobile station under a dynamic memory scheme comprising:
            means for creating non volatile memory items;
            means for preventing deletion of any non-volatile memory items once said non-volatile memory items are created; and
            means for preventing changing of a value of any non-volatile memory items once said non-volatile memory items are created
        means for checking said non-volatile memory items for a unique identifier item, said unique identifier item for identifying software loaded on said mobile station;
        means for checking whether a value stored in said unique identifier item is the same as a software identifier located in said software loaded on said mobile station;
        means for updating said non-volatile memory;

wherein if said means for checking said non-volatile memory for a unique identifier item finds that said unique identifier item does not exist or said means for checking whether said value finds said value is different from said software identifier, said wireless mobile station sends only said software identifier along with an identification of a particular carrier telecommunications company associated with the wireless mobile station, without additional information, to said network and receives a set of changes for said carrier from said network, said means for updating said non-volatile memory executing said set of changes and writing said software identifier to said unique identifier item and adding, when upgrading to a new software load, a new non-volatile memory item rather than replacing a value in an existing non-volatile memory item when the new non volatile memory item corresponds to the existing non volatile memory item, and wherein the new non-volatile memory item is managed under said dynamic management scheme, including preventing deletion or changing of a value in said new non-volatile memory item.

11. The wireless mobile station of claim 10, wherein said unique identifier item value and said software identifier are operating system version numbers of software in said program storage.

* * * * *